(12) United States Patent
Park

(10) Patent No.: US 7,832,765 B2
(45) Date of Patent: Nov. 16, 2010

(54) SEALING DEVICE OF STEERING COLUMN

(75) Inventor: Joonmo Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 445 days.

(21) Appl. No.: 11/963,397

(22) Filed: Dec. 21, 2007

(65) Prior Publication Data

US 2009/0115143 A1    May 7, 2009

(30) Foreign Application Priority Data

Nov. 6, 2007    (KR) .................... 10-2007-0112681

(51) Int. Cl.
*F16J 15/00*    (2006.01)
*B62D 1/16*    (2006.01)

(52) U.S. Cl. .................. 280/771; 280/779; 464/173; 464/178; 74/492

(58) Field of Classification Search .......... 74/492, 74/493; 280/771, 775, 777, 779; 277/634, 277/635, 636; 464/173, 178
See application file for complete search history.

(56) References Cited

U.S. PATENT DOCUMENTS 6,056,297 A * 5/2000 Harkrader et al. .......... 277/634
7,097,568 B2 * 8/2006 Kuczera et al. ............. 464/173
7,549,503 B2 * 6/2009 Kanayama et al. .......... 180/443
2004/0256849 A1 * 12/2004 Suzuki et al. ............... 280/779
2006/0048995 A1 * 3/2006 Kanayama et al. .......... 180/443
2006/0108782 A1 * 5/2006 Kanazawa et al. .......... 280/779

FOREIGN PATENT DOCUMENTS

| JP | 7-47962 | 2/1995 |
| JP | 2005-36933 | 2/2005 |
| JP | 2005-41430 | 2/2005 |
| KR | 10-2008-0081481 A | 9/2008 |

* cited by examiner

*Primary Examiner*—Eric Culbreth
*Assistant Examiner*—Joseph Rocca
(74) *Attorney, Agent, or Firm*—Morgan, Lewis & Bockius LLP

(57) ABSTRACT

The present invention provides a sealing device of a steering column where a sealing member of a steering column passing through a dashboard and a dust cover provided to a dashboard are separately formed and detachably attached to each other, thereby effectively intercepting noise and foreign substances transmitted into a vehicle cabin from an engine room. The sealing device includes a shaft, a sealing member, and a dust cover. The shaft connects a steering column with a steering gearbox. The sealing member is rotatably provided on shaft at a predetermined position. The dust cover is detachably attached to sealing member and is provided to a dashboard.

7 Claims, 6 Drawing Sheets

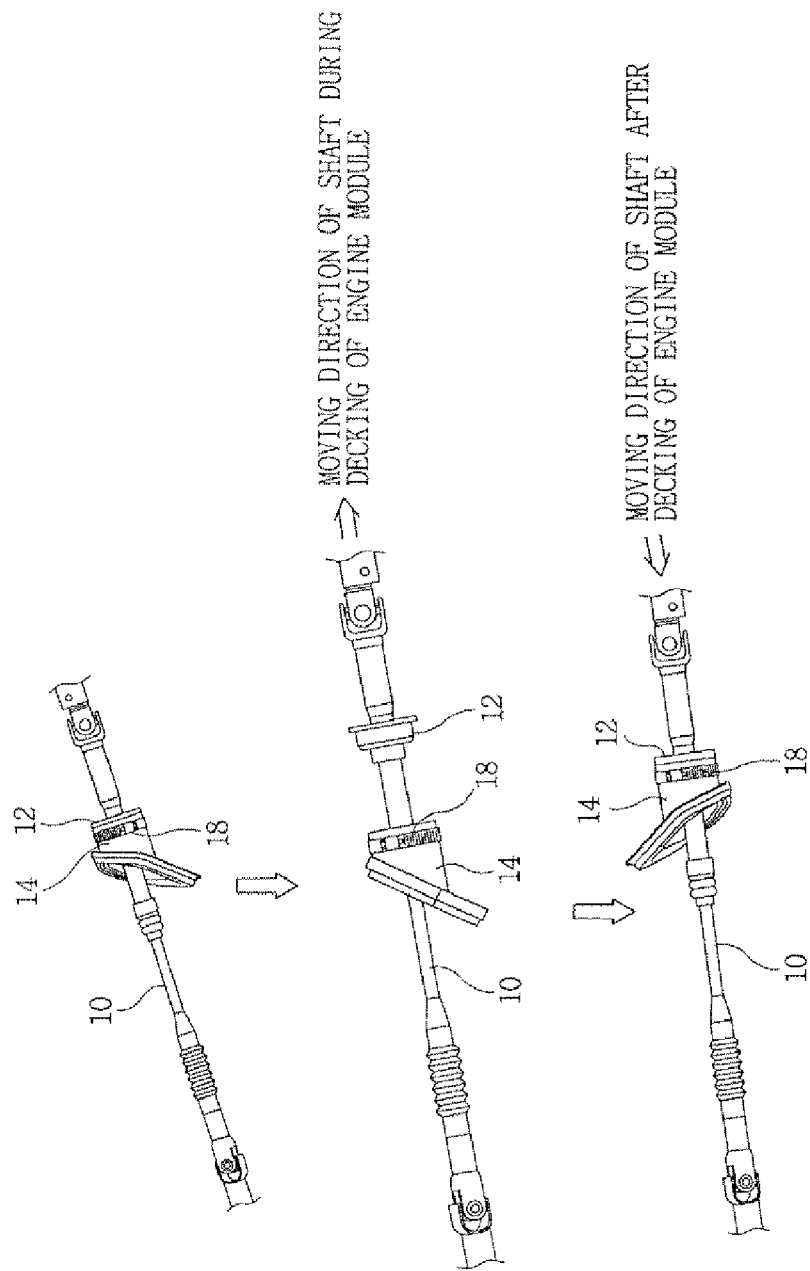

SEALING DEVICE OF STEERING COLUMN

CROSS-REFERENCE TO RELATED APPLICATIONS

The present application is based on, and claims priority from, Korean Application Serial Number 10-2007-0112681, filed on Nov. 6, 2007, the disclosure of which is hereby incorporated by reference herein in its entirety.

FIELD OF THE INVENTION

The present invention relates to a sealing device of a steering column, and more particularly, to a sealing device of a steering column that can effectively intercept noise and foreign substances transmitted into a vehicle cabin through a dashboard.

BACKGROUND OF THE INVENTION

In general, a steering column of a vehicle is a mechanical component that transmits a steering force applied to a steering wheel to wheels. The structure of the steering column is shown in FIG. 1. That is, a steering wheel 1a is fixed to a steering column 1, and a pinion shaft 3a is provided in a steering gearbox 3 that performs a steering operation, using the rotation caused by the movement of a rack bar during the steering. The steering column is connected with the pinion shaft by a shaft 50.

In this case, a shaft 50 passes through a dashboard 5, and the dashboard 5 is provided with a dust cover 52 shown in FIG. 2 in order to intercept noise and foreign substances transmitted into a vehicle cabin from an engine room. Further, an oilless bearing 54 shown in FIG. 3 is fitted into an inner portion of the dust cover 52, and the shaft 50 is inserted into the oilless bearing 54.

Furthermore, as shown in FIG. 4, the shaft 50 includes a protruding portion such as a convolute tube 50a that protrudes toward the outside of the shaft 50 so as to allow the shaft 50 to contract in an axial direction during the collision of a vehicle. A plurality of grooves 54a is formed on inner circumferential surface of the oilless bearing 54 so as to be complementarily engaged with the protrusions of convolute tube 50a.

Meanwhile, the shaft 50 should be moved in an axial direction (indicated by an arrow in FIG. 4) from the engine room toward the vehicle cabin in order not to interfere with an engine module during the mounting of an engine module. For this purpose, tolerance should be formed between the shaft 50 and the oilless bearing 54 so as to allow the convolute tube 50a to be moved. That is, the tolerance is formed between the convolute tube 50a of shaft 50 and the grooves 54a of oilless bearing 54.

As a result, a clearance is formed between the shaft 50 and the oilless bearing 54 so as to allow the convolute tube 50a to be moved with respect to the grooves 54a.

However, the clearance has an undesirable effect such as interception of noise and foreign substances transmitted from the engine room to the vehicle cabin.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made in an effort to solve the aforementioned problems associated with prior arts, and provides a sealing device of a steering column where a sealing member of a steering column passing through a dashboard and a dust cover provided to a dashboard are separately formed and detachably attached to each other, thereby effectively intercepting noise and foreign substances transmitted into a vehicle cabin from an engine room.

According to an exemplary embodiment of the present invention, a sealing device of a steering column includes a shaft, a sealing member, and a dust cover. The shaft connects a steering column with a steering gearbox. The sealing member is rotatably provided on the shaft at a predetermined position. The dust cover is detachably attached to an outer surface of the sealing member and provided to a dashboard.

In a sealing device of a steering column according to the exemplary embodiment of the present invention, a sealing member is rotatably coupled to a shaft that passes through a dashboard so as to connect a steering column with a steering gearbox, and an outer surface of the sealing member comes in close contact with an inner surface of a dust cover fixed to the dashboard. Therefore, a gap between the shaft and the sealing member and a gap between the sealing member and the dust cover are minimized. As a result, it is possible to maximize a sealing effect for intercepting noise and foreign substances that are transmitted into a vehicle cabin from all engine room.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 8 is a view illustrating that the sealing member and the dust cover are engaged with each other and disengaged from each other due to the movement of the shaft during the mounting of an engine module according to an exemplary embodiment of the present invention.

Figure 1:
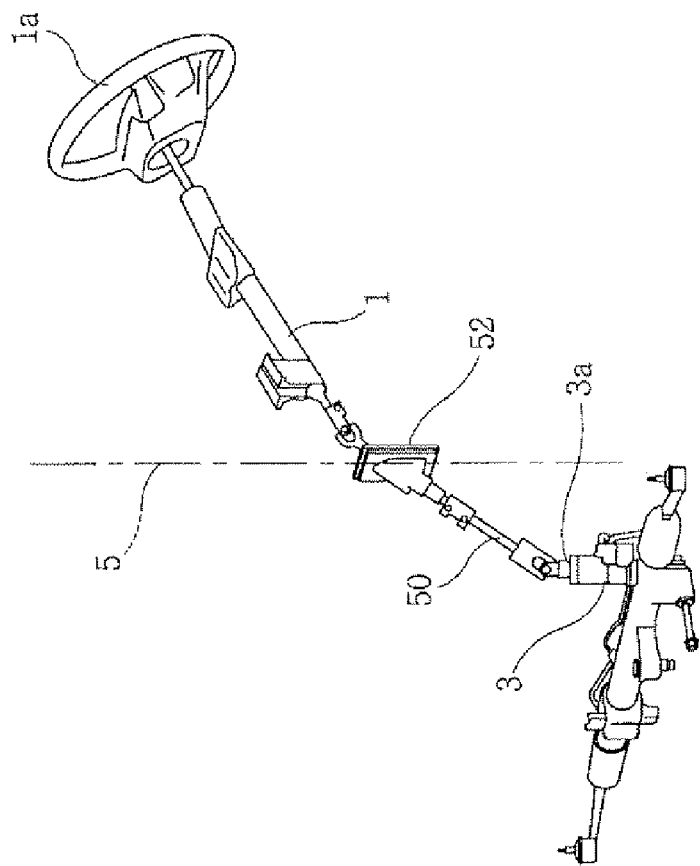
FIG. 1 is an assembled view showing that a steering column in the related art is mounted.
Figure 2:
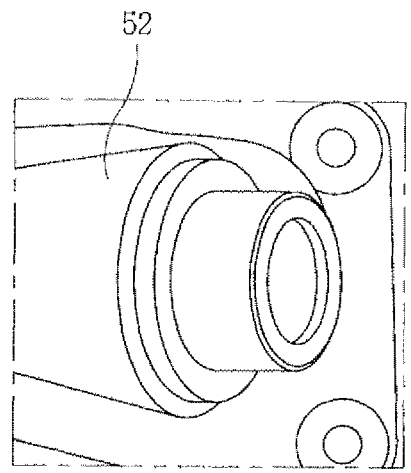
FIG. 2 is a detailed partial view of a dust cover shown in FIG. 1.
Figure 3:
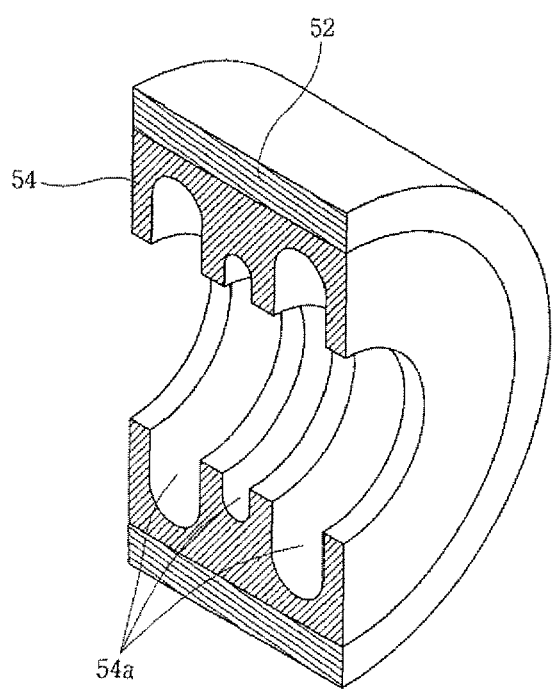
FIG. 3 is a cross-sectional view showing an inner portion of the dust cover shown in FIG. 2.
Figure 4:
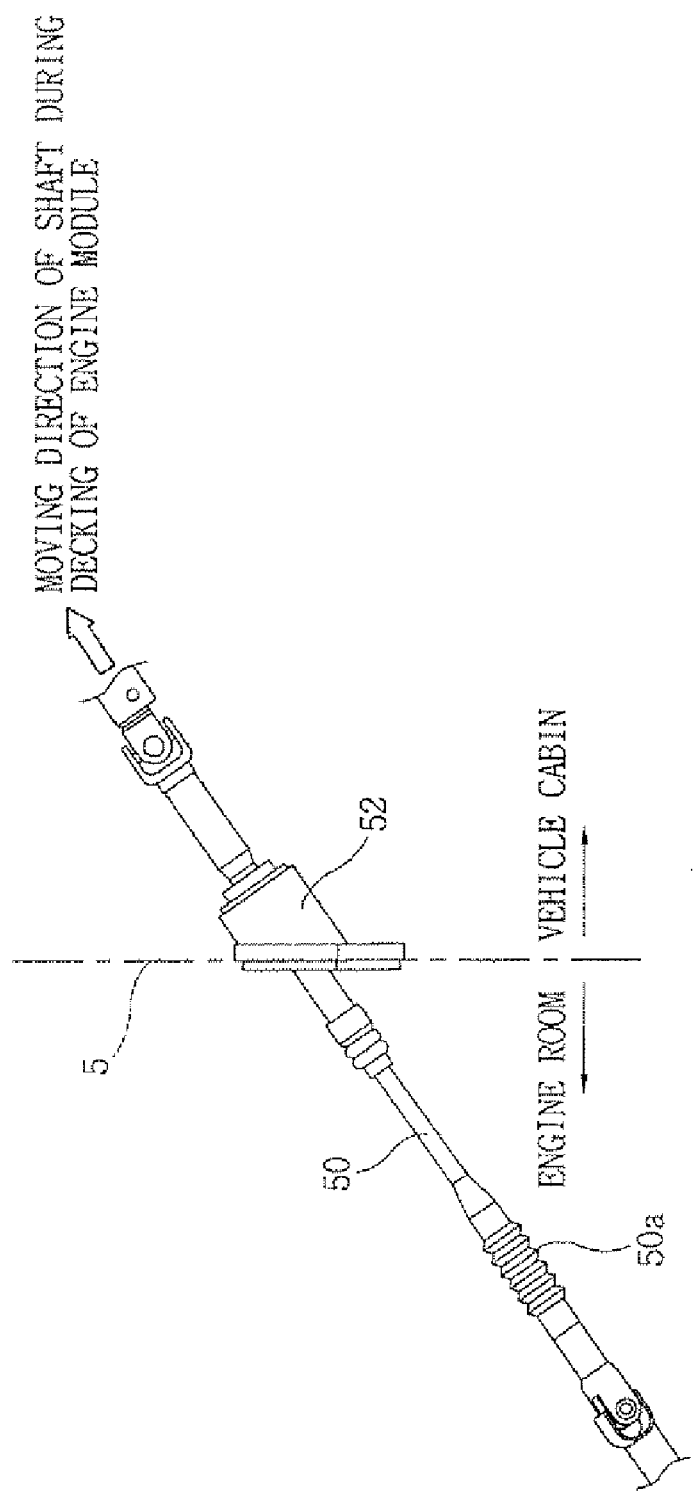
FIG. 4 is a view showing a moving direction of a shaft shown in FIG. 1 during the mounting of an engine module.
Figure 5:
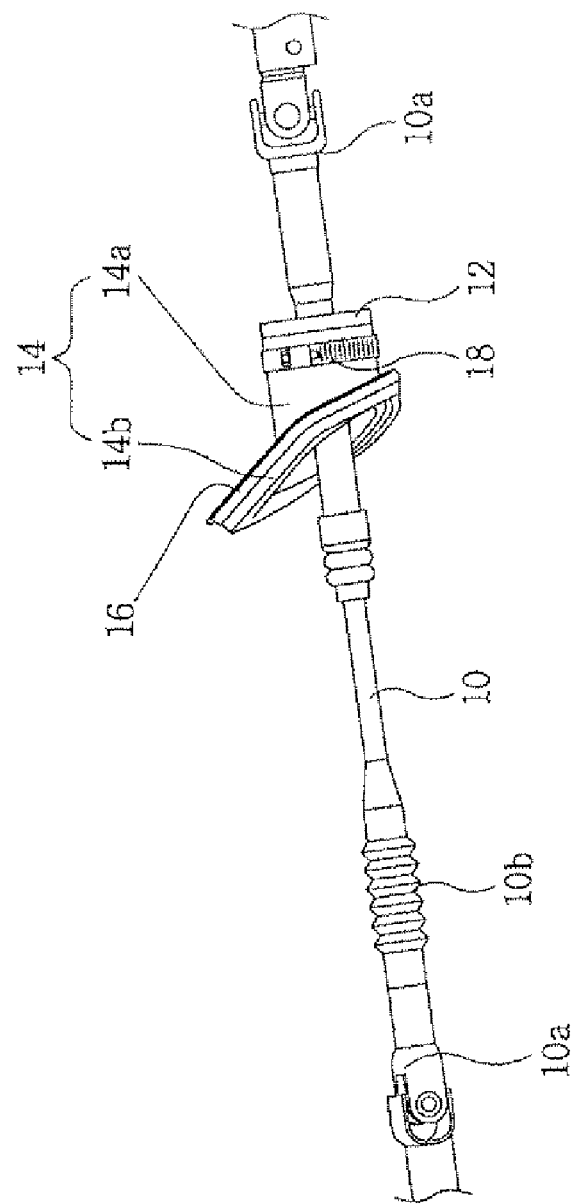
FIG. 5 is a view showing the structure of a sealing device of a steering column according to an exemplary embodiment of the present invention.
Figure 6:
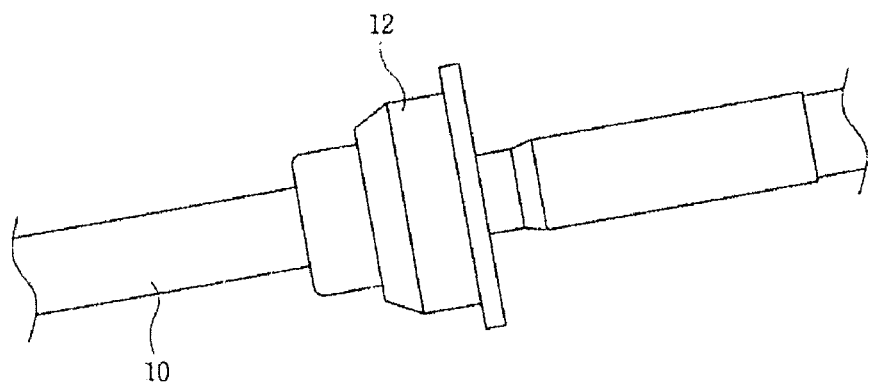
FIG. 6 is a showing a sealing member that is provided on a shaft shown in FIG. 5.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

A preferred embodiment of the present invention will be described in detail below with reference to the accompanying drawings.

As shown in FIGS. 5 to 8, a sealing device of a steering column according to an exemplary embodiment of the present invention includes a shaft 10, a sealing member 12, and a dust cover 14. The mounting of a steering column on a dashboard is referred to FIG. 1, and will be described using reference numerals shown in FIG. 1.

Shaft 10 is an intermediate mechanical component that connects a steering column 1 with a pinion shaft 3a. A steering wheel 1a is fixed to a distal end portion of the steering column 1, and the pinion shaft 3a is provided in a steering gearbox 3 that performs a steering operation by the movement of a rack bar during the steering.

Yokes 10a, which are connected to steering column 1 and pinion shaft 3a by connection portions respectively, are integrally formed with both ends of shaft 10. Shaft 10 includes a protruding portion such as a convolute tube 10b that protrudes toward the outside of the shaft 10 so as to allow the shaft 10 to contract in an axial direction during the collision of a vehicle.

In an exemplary embodiment of the present invention, sealing member 12 is provided around a portion of the outer circumferential surface of shaft 10, and sealingly supports shaft 10 so that the shaft 10 can be rotated. The sealing member 12 is a kind of sound insulating component, and intercepts noise transmitted from an engine room, in which steering, gearbox 3 is provided, to a vehicle cabin where steering column 1 is provided. Accordingly, the sealing member 12 is made of a material, which is advantageous to absorb sound, such as rubber in order to maximize sound insulating performance.

Figure 7:
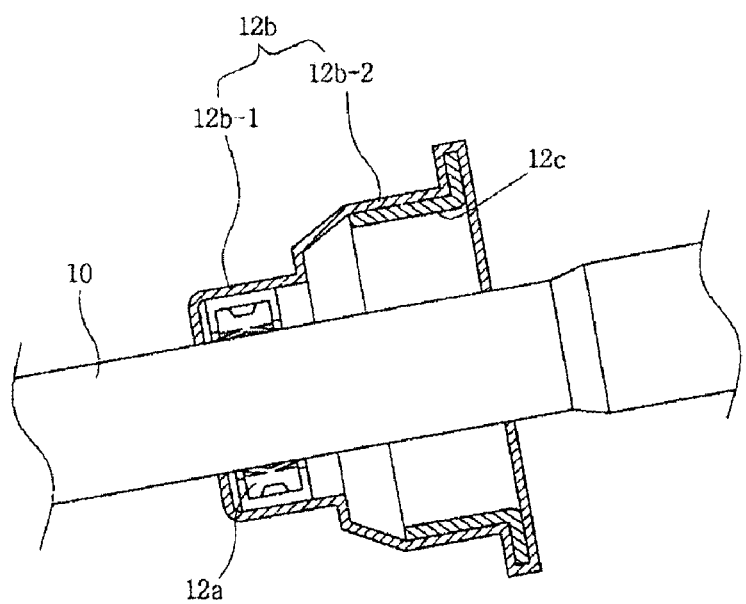
FIG. 7 is a cross-sectional view showing an inner portion of a sealing member shown in FIG. 6.

For this purpose, as shown in FIG. 7, the sealing member 12 includes at least a bearing, 12a, a sealing rubber 12b, and a fixture 12c. The bearing 12a is provided around the outer circumferential surface of shaft 10 so as to be positioned at a predetermined position.

The sealing rubber 12b is received in a dust cover 14 and is made of a cushioning material. The sealing rubber 12b may have a cylindrical shape. The dust cover 14 is explained later.

The fixture 12c is fixed to an inner portion of sealing rubber 12b, and is made of metal for example. The fixture 12c may have a cylindrical shape so as to complementarily support the sealing rubber 12b.

In this case, the sealing member 12 may be restricted in an axial direction of shaft 10, and is allowed to rotate around the outer circumferential surface of the shaft 10 by the bearing 12a with respect to the longitudinal axis of shaft 10 at a predetermined position in order to maximize the sound insulating performance.

In addition, the sealing rubber 12b is formed to have a shape having different diameters. That is, the sealing rubber 12b includes a small-diameter part 12b-1 and a large-diameter part 12b-2.

The small-diameter part 12b-1 receives the bearing 12a therein, and encloses at least a lower lateral portion of the bearing 12a to come in close contact with shaft 10.

The large-diameter part 12b-2 integrally extends from a distal end portion of the small-diameter part 12b-1, and is spaced apart from the longitudinal axis of the shaft 10 in a predetermined distance.

In this case, the fixture 12c is a kind of shaping material that is integrally fitted into an inner portion of the large-diameter part 12b-2 to maintain the shape of the large-diameter part 12b-2 of sealing rubber 12b in a cylindrical shape.

Dust cover 14 is provided to a dashboard 5 that partitions the engine room and the vehicle cabin. The dust cover 14 is formed to have a hollow shape so that the sealing member 12 is received and substantially enclosed by the dust cover 14.

Further, the sealing member 12 is detachably attached to the dust cover 14. For this purpose, the dust cover 14 includes a cylindrical body 14a and a flange 14b, which are integrally formed therewith.

A metal mounting bracket 16 is integrally formed along a proximate end portion of cylindrical body 14a of the dust cover 14. The flange 14b is fitted to the metal mounting bracket 16. The metal mounting bracket 16 may be provided to dashboard 5 to fasten the shaft 10.

The assembled sealing member 12 and dust cover 14 are fitted to each other by a band clamp 18. While the sealing rubber 12b of the sealing member 12 is inserted into the cylindrical body 14a of dust cover 14, the band clamp 18 is fitted to the outer circumferential surface of the cylindrical body 14a of dust cover 14 to fasten the sealing member 12 and the dust cover 14 together.

In an exemplary embodiment of the present invention, the band clamp 18 may fasten the large-diameter part 12b-2 of the sealing member 12 and an upper portion of the dust cover 14 together.

Accordingly, the dust cover 14 is fixed to dashboard 5, and the sealing member 12 is selectively fitted to dust cover 14 by the band clamp 18.

In this case, a sealing between the shaft 10 and the sealing member 12 is achieved by the close contact between the small-diameter part 12b-1 rotatably supported by the bearing 12a and the shaft 10. Further, a sealing between the large-diameter part 12b-2 and the dust cover 14 is achieved by the close contact between an upper portion of the large-diameter part 12b-2 and the cylindrical body 14a of the dust cover 14.

In an exemplary embodiment, the fixture 12c may be made of metal and received in the large-diameter part 12b-2. The fixture 12c functions to support outwards the large-diameter part 12b-2 to prevent the large-diameter part 12b-2 of sealing member 12 from collapsing due to the band clamp 18. Therefore, due to the fixture 12c, the large-diameter part 12b-2 of sealing member 12 and the dust cover 14 firmly come in close contact with each other to increase a sealing effect.

Further, when the band clamp 18 is released during the mounting operation of an engine module, the shaft 10 can be moved together with the sealing member 12 in an axial direction of the shaft 10 with respect to the dust cover 14. Therefore, it is possible to easily perform a mounting operation.

Furthermore, since a gap between the shaft 10 and a lower portion of sealing member 12 and a gap between an upper portion of the sealing member 12 and the dust cover 14 are to be minimal, it is possible to suppress the transmission of noise and foreign substances into the vehicle cabin from the engine room as much as possible.

In detail, unlike in the related art, the sealing member 12 is not fixed into the dust cover 14 and is rotatably fixed to the shaft 10. For this reason, during the mounting of the engine module, the sealing member 12 can be moved together with the shaft 10.

Accordingly, even though a through hole is formed in the dust cover 14 so as to allow convolute tube 10b of shaft 10 to pass through the through hole, the sealing member 12 can be air-tightly received in the dust cover 14 when the shaft 10 is moved to an original position after the mounting of the engine module. Therefore, it is possible to appropriately achieve the sealing between the engine room and the vehicle cabin.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A sealing device of a steering column, the sealing device comprising:
   a shaft that connects a steering column with a steering gearbox;
   a sealing member that is rotatably provided on a portion of the shaft at a predetermined position; and
   a dust cover that is detachably attached to the sealing member at a front portion and provided to a dashboard at a rear portion;
   wherein the dust cover has a front opening portion opened toward the sealing member and the sealing member is coupled therein by upward or downward movement of the shaft along an axial direction of the shaft and the outside of the front opening portion is clamped to fix the sealing member to the dust cover;
   wherein the sealing member includes:
      at least a bearing that is coupled onto the shaft;
      a sealing rubber that receives the bearing therein, is received in the dust cover, and is made of a cushioning material so as to have a cylindrical shape; and
      a fixture that is fixed to an inner portion of the sealing rubber.

2. The sealing device as defined in claim 1, wherein the sealing rubber is made of a cushioning material so as to have a cylindrical shape and the fixture is made of metal so as to have a cylindrical shape.

3. The sealing device as defined in claim 1, wherein the sealing rubber is formed to have a shape having different diameters in an axial direction of the shaft,
   the sealing rubber includes a small-diameter part that receives the bearing therein and comes in close contact with the shaft, and a large-diameter part that integrally extends from a distal end portion of the small-diameter part and is spaced apart from the shaft in a predetermined distance, and
   the fixture is integrally fitted into an inner portion of the large-diameter part.

4. The sealing device as defined in claim 3, wherein the small-diameter part of the sealing member is positioned lower than the large-diameter part.

5. The sealing device as defined in claim 1, wherein the dust cover includes:
   a cylindrical body that receives an outer surface of the sealing member, and
   a flange fitted to a mounting bracket that is integrally formed with a proximate end portion of the cylindrical body and provided to the dashboard, wherein the cylindrical body and the flange are integrally formed with the dust cover.

6. The sealing device as defined in claim 5, wherein the sealing rubber of the sealing member and the cylindrical body of the dust cover are fitted to each other by a band clamp.

7. The sealing device as defined in claim 1, wherein the dust cover further includes a rear opening portion dimensioned such that a convolute tube formed to the shaft is passable through the front opening portion and the rear opening portion of the duct cover.

* * * * *